(No Model.)

P. STONE.
FILTER.

No. 466,809. Patented Jan. 12, 1892.

Witnesses
M. C. Galer
G. J. Finlayson

Inventor
Peter Stone
by Hazard & Townsend
his attys.

UNITED STATES PATENT OFFICE.

PETER STONE, OF LOS ANGELES, CALIFORNIA.

FILTER.

SPECIFICATION forming part of Letters Patent No. 466,809, dated January 12, 1892.

Application filed November 12, 1890. Serial No. 371,156. (No model.)

*To all whom it may concern:*

Be it known that I, PETER STONE, a citizen of the United States, residing at Los Angeles, in the county of Los Angeles and State of California, have invented a new and useful Improvement in Filters, of which the following is a specification.

The object of my invention is to avoid clogging the filtering material with sedimentary deposits; also to avoid contact of the water being filtered with the sediment deposited; also to provide for convenient and thorough cleansing of the filter from such sedimentary deposits, and also to avoid clogging the filter with light matter that may float on the surface of the water.

The accompanying drawings illustrate my invention.

Figure 1:
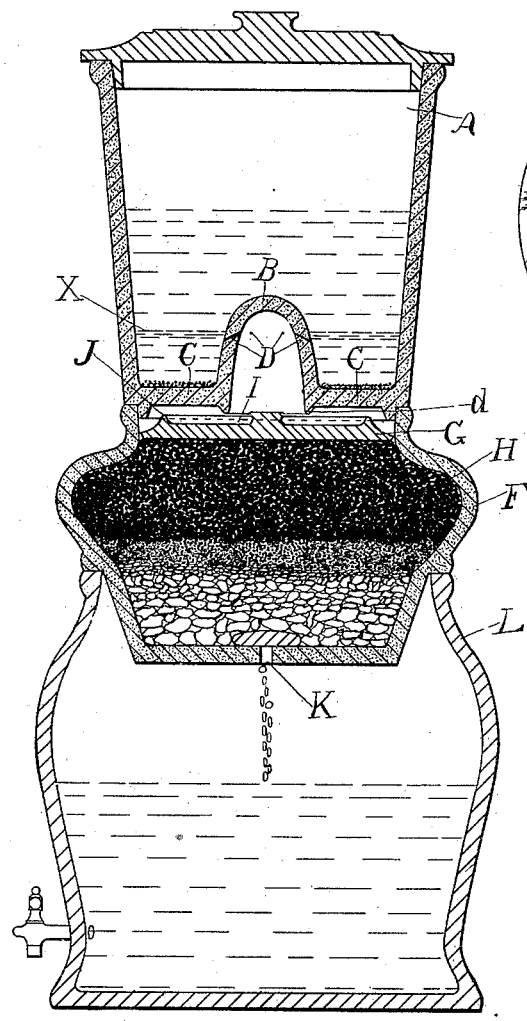
Figure 2:
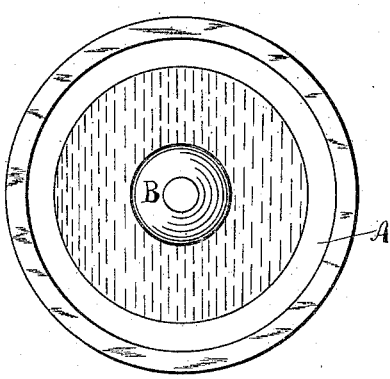
Figure 3:
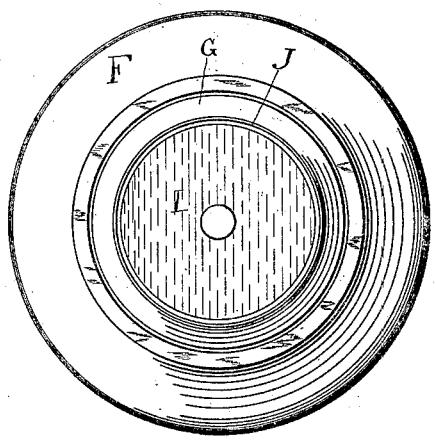

Figure 1 is a vertical mid-section of my improved filter in operation. Fig. 2 is a view looking down into the receiving or settling basin and shows the water therein as having flowed out until it has sunk to its lowest level, as indicated at $x$ in Fig. 1. Fig. 3 is a plan view with the receiving or settling basin removed.

My invention relates more particularly to the construction and arrangement of parts whereby I accomplish the objects above specified, and comprises a settling-basin and percolator A, provided with a thick-walled, narrow-topped, downwardly-opening discharge-dome B, rising above the floor C of the basin, imperforate for a space above such floor to form a sediment-reservoir, and provided above such imperforate space with small inwardly and upwardly inclined passages or perforations D to conduct the water upward from the basin to the inside face of the dome-wall.

It also comprises the combination of the settling-basin and percolator A, having such a dome provided at its downwardly-opening mouth, with an annular drip-bead $d$ projecting downward below the under side of the floor of the settling-basin and percolator A, a filter-basin F, having an expanded body and a contracted neck and arranged beneath the settling-basin and provided with the centrally-perforated bottom and the filtering material H, and the impervious sediment and distributing slab G, seated upon the top of the filtering material H in the contracted neck of the filter-basin and provided on its upper face with a sediment-basin I, arranged beneath the open mouth of the dome and formed by the level-topped annular bead J, arranged near the rim of the slab to form the wall of the sediment-basin, having its top near the plane of the bottom drip-bead $d$.

K is the central perforation in the bottom of the filter-basin.

L is the receiver or reservoir for the filtered water.

In practice the filter is placed with its parts in position, as shown in Fig. 1, and the receiving or settling basin A is partially or wholly filled with water which seeps through the small passages D, which are about the size that would be made by an ordinary toilet-pin. The number of these holes vary with the size of the filter, and I have ordinarily made my filters after the following rule.

In the filter which I call "No. 5" the top A holds seven quarts, the bottom L eight quarts, and I provide two passages or perforations in the dome. This filters four quarts per hour.

In my filter No. 7 the top A holds eight quarts, the bottom L holds ten quarts, and I provide three perforations. This filters six quarts per hour. Thus it will be seen I provide one perforation for each two quarts desired to be filtered per hour.

The water seeping through the perforations flows from the inner mouths of the perforations down the inner wall of the dome and drips off from the lower end of the drip-bead $d$ into the sediment-basin I, which it fills, and thence flows over the level edge of the bead J, and thence over the rim of the sediment and distributing slab G into the filtering material, the top of which is granulated animal charcoal, the middle layer being sand and the bottom layer gravel, as is customary in filters.

It will be seen that by reason of the narrow-topped dome nearly all the sediment from the water is deposited below the discharge-perforations D, so that, though the filter is used without cleansing until a considerable deposit of sediment is made, very little of the sediment will come into direct contact with the water to be filtered. The top of the dome is rounded, so that the sediment will be less liable to settle thereon. None of the water passes through any of the sediment, and when the surface of the water reaches the level of the inner mouths of the passages D (which mouths are arranged in a horizontal plane) it ceases to flow, and the surface of the water therefore does not reach the center mouths of the passages. Thus I prevent any of the matter which may be floating on the top of the water from being drawn into the passages D.

There is an additional advantage in causing a quantity of water to remain in the settling-basin, as this prevents the sediment from becoming dry and set, and a simple washing of the basin is all that is necessary to cleanse it. This can easily be done whenever the basin is refilled.

My filter is made of earthenware and the settling-basin and filter-basin are preferably porous, so that the water in the filter may be cooled by evaporation. I prefer to glaze the reservoir L on the inside to prevent the water from seeping through to wet the stand or other place upon which the filter may be placed. The purpose of the slab G is twofold. It distributes the water evenly over a wide radius of the filtering material in a circle substantially midway between the circumference of the filtering material and the extended axis of the central discharge-perforation K, so that the water will soak into and percolate through all of the filtering material. It also retains all of the sediment which may pass through the perforations D before the water in A has had time to settle. The purpose of the drip-bead d is to conduct the water down to the surface of the water in the sediment-basin I, so that it will fall thereinto without disturbing the sediment.

I am aware that a filter has heretofore been provided with a perforated downwardly-opening discharge-dome rising above the floor of the basin; but such domes have heretofore been provided with broad projecting tops or ledges projecting out beyond the sides of the dome, and which form resting-places for the deposit of the sediment and retain it in the path of the water to be filtered, so that the water passing through the filter comes into contact with the sediment and is contaminated thereby. These filters are also difficult to keep clean. My filter differs from such filters, in that the discharge-dome is substantially conical in form and has no projections and does not retain the sediment in the path of the water to be filtered, but, on the contrary, is so arranged that the deposit occurs much below the outlet and the water is not contaminated by such deposit. This feature also reduces the labor and inconvenience of cleansing the filter.

My invention is to be distinguished from those filters which are designed to be attached directly to the faucet or supply-pipe to filter the water as it flows through under pressure and in which filters it is customary to inclose the filtering material in a perforated metallic case, which in turn is inclosed in an outside case with an annular chamber between the two cases. Filters of this class do not accomplish the main purpose for which my invention is designed—viz., to prevent the sediment from entering the filtering material, so that the filtering material is not compelled to perform any function except to remove the impurities which cannot readily be removed by precipitation.

I prevent the sediment from entering or coming into contact with the filtering material. This I accomplish by means of my improved discharge-dome B, having in its side walls the minute inclined perforations extending inwardly and upwardly through such walls, as shown. This arrangement prevents any appreciable current of escaping water except within the perforations.

Now having described my invention, what I claim as new, and desire to secure by Letters Patent, is—

1. A filter comprising the combination of the settling-basin having the discharge-dome rising above the floor of the basin, imperforate for a space above such floor to form a sediment-reservoir, and provided above such imperforate space with small perforations, the filter-basin having the perforated bottom and provided with filtering material, and the impervious sediment and distributing slab seated upon the top of the filtering material and provided upon its upper face with the sediment-basin beneath the mouth of the dome.

2. A filter comprising the combination of the settling-basin having the discharge-dome rising above the floor of the basin, imperforate for a space above such floor to form a sediment-reservoir, and provided above such imperforate space with small perforations and provided at its mouth with the annular drip-bead projecting downward below the under side of the floor of the basin, a filter-basin having the centrally-perforated bottom and provided with the filtering material, and the impervious sediment and distributing slab seated upon the top of the filter and provided on its upper face with a sediment-basin arranged beneath the open mouth of the dome and having the top of its wall near the plane of the bottom of the drip-bead.

3. In a filter, the combination of the settling-basin and percolator, the filter-basin having a swelled body and a contracted mouth and arranged beneath the settling-basin and provided with the filtering material and centrally-perforated bottom, and the imperforate sediment and distributing slab seated upon the filtering material in the contracted neck of the filtering-basin and provided on the upper face with the sediment-basin arranged beneath the opening mouth of the dome.

4. In a filter substantially such as set forth, the combination of the settling-basin provided with the discharge-dome having the downwardly-projecting annular drip-bead, the filter-basin arranged therebeneath and provided with the filtering material and perforated bottom, and the sediment and distributing slab provided on its upper face with the sediment-basin having the top of its wall near the plane of the bottom of the drip-bead.

PETER STONE.

Witnesses:
JAMES R. TOWNSEND,
M. C. GALER.